United States Patent Office 2,831,203
Patented Apr. 22, 1958

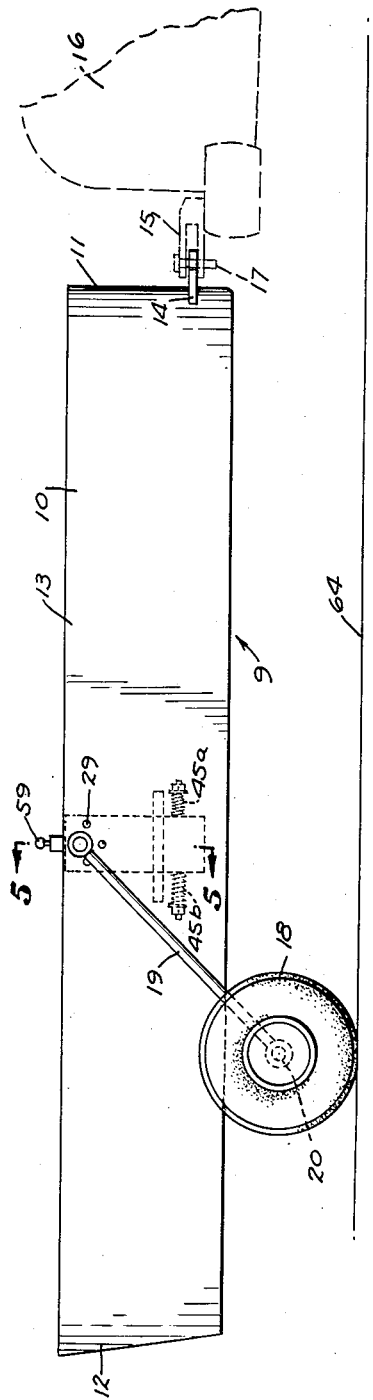

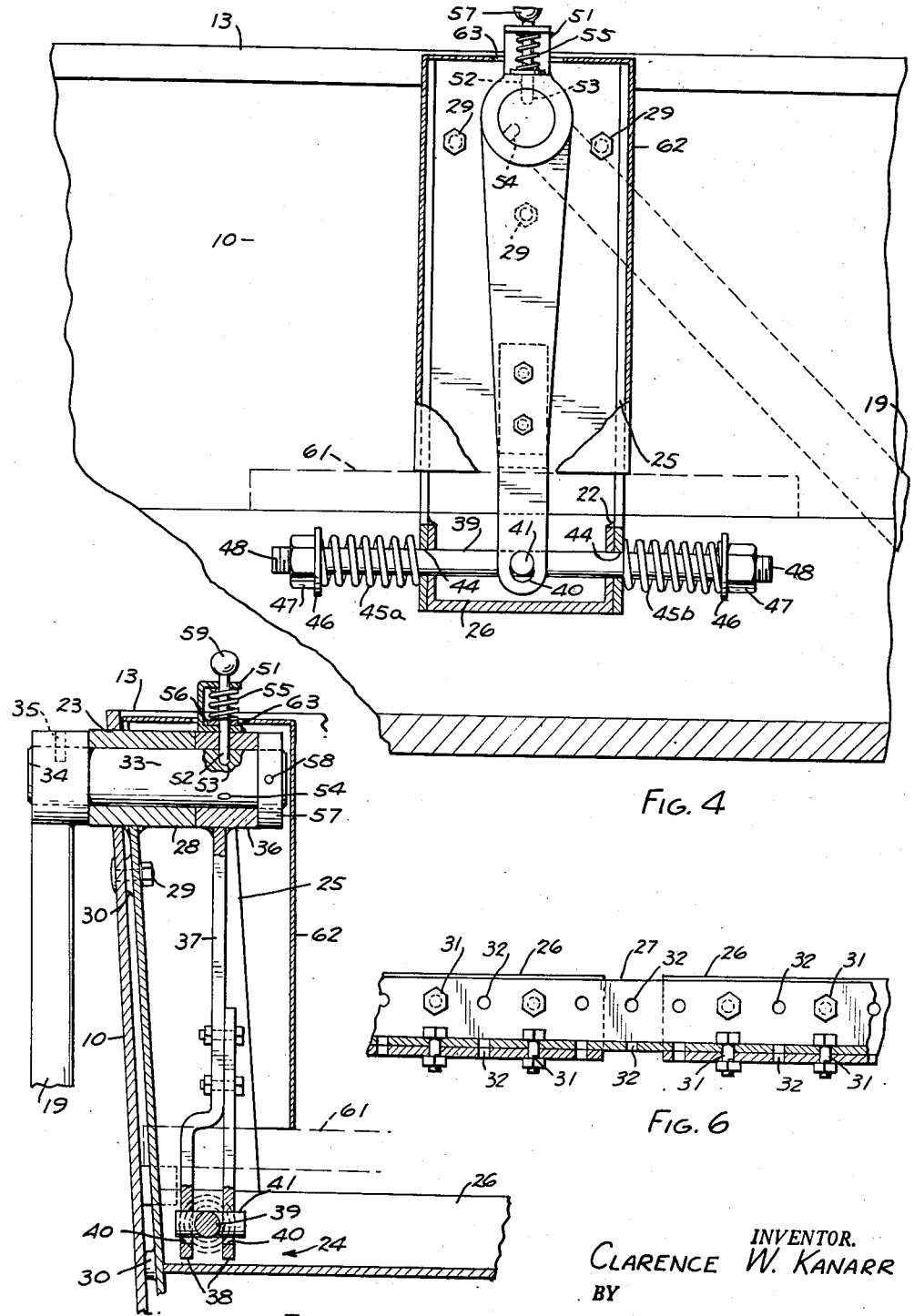

2,831,203

AMPHIBIOUS TRAILER BOAT

Clarence W. Kanarr, Grosse Pointe Park, Mich.

Application October 4, 1954, Serial No. 460,161

8 Claims. (Cl. 9—1)

This invention relates to a boat having retractable wheels adapting it for use as a highway trailer.

The invention is especially applicable to rowboats and the like, which the owner frequently transports on a relatively expensive, specially built trailer towed behind his automobile. The boat must often be manually carried in and out of the water for launching and landing, or the trailer itself must be wheeled into and out of the water. Use of the ordinary boat trailer is both expensive and inconvenient. It is known to mount retractable wheels on a boat to facilitate its transportation, launching and landing.

An object of this invention is to provide an inexpensive, improved amphibious boat trailer construction. One form of the invention is shown in the accompanying drawings.

Fig. 1 is a partly diagrammatic side elevational view of a boat according to this invention in use as a highway trailer.

Fig. 2 is a partly diagrammatic front elevation of the boat with wheels lowered to ground-engaging position.

Fig. 3 is a fragmentary, partly diagrammatic side elevation illustrating the wheels in retracted position.

Fig. 4 is an enlarged view on line 4—4 of Fig. 2 with some parts broken away to show construction.

Fig. 5 is an enlarged, generally sectional view on line 5—5 of Fig. 1.

Fig. 6 illustrates a telescoped construction of struts extending laterally within the boat.

Shown in Fig. 1 is a trailer boat 9 having a hull 10 with a prow 11, stern 12 and gunwales 13. Prow 11 has a draw bar 14 adapted to be secured to a trailer hitch 15 on an automobile 16 by a pin 17. Retractable ground-engaging wheels 18 are mounted on opposite sides of the hull through outboard lever arms 19 and stub axles 20.

Hull 10 has oppositely disposed openings 23 in its sides located generally amidships and subjacent gunwales 13. Inboard of the hull is a frame assembly 24, preferably comprising upright channel members 25, transverse channel members 26 welded thereto as at 22 and a link member 27 adjustably securing members 26 together by bolts 31 engaged in openings 32. Each upright member 25 has a bearing portion 28 projecting through an opening 23 and is secured to the adjacent side hull 10 preferably by bolts 29. Members 25 may be spaced from the sides of the hull by spacers 30. A pintle 33 fits rotatably in each bearing 28 and has an outwardly projecting end portion 34 fixed on arm 19 by a pin 35.

A sleeve 36 independently rotatable on each pintle 33 has a radially projecting lever 37 with a bifurcated end 38 embracing a rod 39 and articulated therewith by slots 40 engaging a pin 41 on the rod. Rod 39 projects through openings 44 in the frame assembly and supports oppositely disposed, stressed coil springs 45a and 45b which seat against the outside of the frame assembly and re-act against washers 46 adjustably positioned by nuts 47 on the threaded ends 48 of the rod. Sleeve 36 carries a bracket 51 apertured for slidably holding a pin 52 in a position radial of pintle 33. Pin 52 is biased for engagement within locking recesses 53 and 54 in the pintle by spring 55 acting through washer 56 carried by the pin. Sleeve 36 is secured on pintle 33 by a ring 57 fixed on the pintle by a pin 58. Pin 52 has an operating handle 59.

Channels 26, link 27 and rod 48 are preferably disposed immediately beneath a central seat 61 on the boat and a cover 62 conceals the inboard portions of the mechanism above the seat. Cover 62 has an opening 63 through which operating handle 59 projects. The transverse portion of frame assembly 24 adds stability to the structure and its adjustable length facilitates mounting the frame structure in boats of various widths.

In use, it may be assumed that wheels 18 are in ground-engaging position (Figs. 1 and 2) and that the device is to be used as a trailer drawn by automobile 16. Pins 52 are engaged within recesses 53, locking sleeves 36 non-rotatably to pintles 33. The weight of hull 10 on wheels 18 rotates lever arms 19 and levers 37 on pintles 33, shifting rods 48 to the right as Fig. 4 is viewed and compressing springs 45a until the stress therein supports the hull above the ground or highway 64. During towing, springs 45a serve as shock absorbers for preventing excessive strain on lever arms 19 and the frame assembly, and springs 45b resist upward movement of hull 10 relatively to the wheels, thereby dampening bouncing motion of the hull on springs 45a.

To launch the boat, hitch 15 is preferably disconnected and the boat is wheeled into the water to a depth sufficient to float hull 10. Each locking pin 52 is withdrawn from recess 53 by means of operating handle 59, thereby disconnecting sleeve 36 and lever 37 from pintle 33. Each wheel 18 is then swung in a clockwise direction as Fig. 1 is viewed to a retracted position above the water line 65 (Fig. 3) where pin 52 snaps into recess 54 under action of spring 55, thereby locking sleeve 36 and lever 37 to pintle 33. The stress in springs 45a supports wheels 18 in retracted position, springs 45b dampening any tendency of the wheels to bounce when the boat is in rough water. Recesses 54 are preferably circumferentially located so that in their retracted position wheels 18 are forward of pintles 33 to balance the weight of an outboard motor, not shown, which may be mounted on stern 12.

To reconvert the boat for use as a trailer, pins 52 are withdrawn from recesses 54, and wheels 18 are swung counterclockwise as Fig. 1 is viewed until they reach their ground-engaging positions, where pins 52 again snap into recesses 53. The boat may then be wheeled out of the water and re-attached to hitch 15. The stress in springs 45a and 45b may be regulated according to operating conditions by turning nuts 47 on the threaded ends 48 of rod 39.

I claim:

1. A boat comprising, a hull, said hull having an opening in each side, an inboard frame adjacent each opening, means on each frame forming a bearing aligned with the adjacent opening, a pintle rotatably mounted within each bearing, an outboard lever arm at each side of the hull, a ground engaging wheel on each lever arm, means securing said lever arms to said pintles, so that said wheels can be swung selectively to ground engaging position and retracted position, resilient support means on each frame, a sleeve independently rotatable on each pintle, projecting means on each sleeve operable by rotation thereof to stress said resilient support means, each sleeve having an aperture, a locking pin slidably projecting through the aperture, each pintle having recesses positioned for registry with said pin in said positions of the wheels, said pins being slidably engageable in said recesses, whereby to releasably lock said pintles and sleeves together for resiliently supporting said wheels selectively in said positions.

2. A boat comprising, a hull, said hull having an opening in each side, an inboard frame adjacent each opening, each frame having a bearing portion projecting through the adjacent opening, a pintle rotatably mounted within each bearing and projecting through said opening, an outboard lever arm at each side of the hull, a ground engaging wheel on each lever arm, means securing said lever arms to said pintles, so that said wheels can be swung selectively to ground engaging position and retracted position, resilient support means on each frame, a sleeve independently rotatable on each pintle, projecting means on each sleeve operable by rotation thereof to stress said resilient support means, each sleeve having an aperture, a locking pin slidably projecting through the aperture, each pintle having recesses positioned for registry with said pin in said positions of the wheels, said pins being slidably engageable in said recesses, whereby to releasably lock said pintles and sleeves together for resiliently supporting said wheels selectively in said positions, and means on said sleeves biasing said pins into engagement with said recesses.

3. A boat comprising, a hull, said hull having an opening in each side, an inboard frame adjacent each opening, each frame having a bearing portion projecting through the adjacent opening, a pintle rotatably mounted within each bearing and projecting through said opening, an outboard lever arm at each side of the hull, a ground engaging wheel on each lever arm, means securing said lever arms to said pintles, so that said wheels can be swung selectively to ground engaging position and retracted position, resilient support means on each frame, said resilient support means including at least one coil spring on said frame and threaded means on said frame operable for adjusting the stress in said spring, a sleeve independently rotatable on each pintle, projecting means on each sleeve operable by rotation thereof to stress said resilient support means, each sleeve having an aperture, a locking pin slidably projecting through the aperture, each pintle having recesses positioned for registry with said pin in said positions of the wheels, said pins being slidably engageable in said recesses, whereby to releasably lock said pintles and sleeves together for resiliently supporting said wheels selectively in said positions, and means on said sleeves biasing said pins into engagement with said recesses.

4. A boat comprising, a hull, an outboard lever arm at each side of said hull with a ground engaging wheel thereon, a pintle on each lever arm, means journalling said pintles on said hull so that said wheels can be swung selectively to a ground engaging position and a retracted position, said pintles extending to the interior of said hull, resilient support means mounted on the interior of said hull adjacent each pintle, an element independently rotatably mounted on each of said pintles, said elements being operable upon rotation thereof to stress said resilient support means, and means releasably securing said elements non-rotatably to said pintles when said wheels are in said positions, so that said wheels can be selectively supported in said positions by said support means.

5. A boat comprising, a hull, an outboard lever arm at each side of said hull with a ground engaging wheel thereon, a pintle on each lever arm, means journalling said pintles on said hull so that said wheels can be swung selectively to a ground engaging position and a retracted position, said pintles extending to the interior of said hull, resilient support means mounted on the interior of said hull adjacent each pintle, a sleeve independently rotatably mounted on each of said pintles, said sleeves being operable upon rotation thereof to stress said resilient support means, each pintle and its respective sleeve having openings therein arranged for registry when said wheel is swung to said positions, and pin means removably secured in said openings for releasably locking said sleeves non-rotatably on said pintles, so that said wheels can be selectively supported in said positions by said support means.

6. A boat comprising, a hull, said hull having a stern portion adapted to have a motor mounted thereon, an outboard lever arm at each side of said hull with a ground engaging wheel thereon, a pintle on each lever arm, means journalling said pintles on said hull, said wheels being arranged to be swung selectively to a ground engaging position aft of said pintles and to a retracted position, said retracted position being forward of said pintles so that said wheels will tend to balance the weight of a motor on said stern when in said retracted position, said pintles extending to the interior of said hull, resilient support means mounted on the interior of said hull adjacent each pintle, an element independently rotatably mounted on each of said pintles, said elements being operable upon rotation thereof to stress said resilient support means, and means releasably securing said elements non-rotatably to said pintles when said wheels are in said positions, so that said wheels can be selectively supported in said positions by said support means.

7. A boat comprising, a hull, an outboard lever arm at each side of said hull with a ground engaging wheel thereon, a pintle on each lever arm, means journalling said pintles on said hull so that said wheels can be swung selectively to a ground engaging position and a retracted position, said pintles extending to the interior of said hull, coil spring means mounted on the interior of said hull adjacent each pintle, a sleeve independently rotatably mounted on each of said pintles, a projection on each sleeve operable upon rotation of said sleeve to stress said coil spring means, each pintle and its respective sleeve having openings therein arranged for registry when said wheel is swung to said positions, and pin means removably secured in said openings for releasably locking said sleeves non-rotatably on said pintles so that said wheels can be selectively supported in said positions by said coil spring means.

8. The combination defined in claim 7 wherein said coil spring means includes a first coil spring arranged to bear the load of a lever arm and wheel in said positions, and a second coil spring arranged to resist movement of said projection away from said first coil spring to dampen bouncing motion of said wheels relatively to said hull.

References Cited in the file of this patent

UNITED STATES PATENTS

| | | |
|---|---|---|
| 2,371,864 | Woolson et al. | Mar. 20, 1945 |
| 2,457,567 | Kuns | Dec. 28, 1948 |
| 2,683,268 | Strayer | July 13, 1954 |

FOREIGN PATENTS

| | | |
|---|---|---|
| 981,349 | France | Jan. 10, 1951 |